United States Patent Office 3,432,547
Patented Mar. 11, 1969

3,432,547
BIS-AMINOPHOSPHINIC ACIDS USEFUL AS
ANTI-BACTERIAL AGENTS
Andrew T. Guttmann, Lakewood, Ohio, and Eric Jungermann, La Grange, and Warner M. Linfield, Evanston, Ill., assigors to Armour and Company, Chicago, Ill., a corporation of Delaware
No Drawing. Filed Aug. 21, 1963, Ser. No. 303,683
U.S. Cl. 260—502.5         3 Claims
Int. Cl. C07f 9/48

This invention relates to the control of bacterial growth and more particularly to an antibacterial agent and to the method of use thereof.

The principal object of our invention is to provide an antibacterial agent which is useful, especially in combination with an ordinary soap or cleansing agent. Another object is to provide an antibacterial agent and a highly effective method of use thereof. Other objects will appear as this specification proceeds.

We have discovered that certain bis-aminophosphinic acids have definite antibacterial properties and that these antibacterial properties can be further enhanced in the presence of an alkaline agent, such as soap or any other conventional alkaline cleansing agent. Therefore, a washing operation and a treatment to inhibit bacterial growth may be undertaken in the same operation.

The bis-aminophosphinic acids which exhibit bacteriostatic properties have been found to have the general formula:

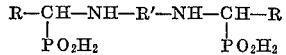

wherein R may be a substituted or unsubstituted aryl group and R' is an alkylene radical having from 2 to 4 carbons. When R is substituted, such groups as nitro, hydroxyl, and halogen may be used. Particularly effective results are obtained where R is phenyl, substituted by either halogen or hydroxy, i.e., halogen substituted phenyl and hydroxy substituted phenyl although the extent of such effectiveness varies somewhat according to the degree of halogenation or hydroxylation and the spatial relationships of such groups. Better results are had when the halogen groups on R, where R is phenyl, are located in the meta or para positions rather than in the ortho positions; however, with the substitution of hydroxyl on the R group, it has been found that substitution in the ortho position generally results in somewhat higher activity than either the meta or para positions.

Antibacterial agents represented by the general formula given above may be prepared by reacting a Schiff's base with hypophosphorus acid. End products of higher purity are obtained whenever the Schiff's base (resulting from the condensation of an alkylene diamine, such as ethylene diamine, and aromatic aldehydes) is prepared first followed by the reaction with hypophosphorus acid. It has been found unnecessary to isolate the Schiff's base prior to reaction with the acid. Thus, the general reaction leading to the formation of the preferred compounds is as follows:

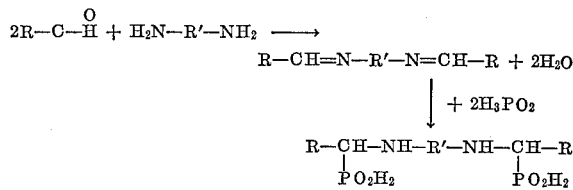

The Schiff's bases can be obtained by boiling the alkylene diamine and aromatic aldehyde in benzene, with azeotropic removal of water followed by crystallization. Since the bis-aminophosphinic acids of this invention are only slightly soluble in hot ethanol, this solvent can be used to precipitate the bis-aminophosphinic acids from the reaction mixture.

The bis-aminophosphinic acids are generally light yellow to white in color, microcrystalline solids, insoluble in water, moderately soluble in methanol, very slightly soluble in ethanol and most other organic solvents. The mono and dialkali salts are very-water soluble.

Reference may be had to the following ilustrative examples for a more complete understanding of this invention.

Example I

Ethylenediamino - N,N', bis(3,4-dichlorophenyl) phosphinic acid has been prepared as follows:

A Schiff's base from ethylene diamine and 3,4-dichlorobenzaldehyde was prepared by boiling equimolar amounts of the reactants in benzene, with azeotropic removal of water, followed by filtration and recrystallization from benzene. To 31.8 grams of the Schiff's base and 70 grams of ethyl alcohol, there was added 22.4 grams of 50% aqueous hypophosphorus acid. After heating under reflux for three hours, the solution was cooled, then diluted with 1 liter of acetone, with stirring. The white precipitate was washed thoroughly with acetone, and vacuum dried. The yield was 32 grams (74.5% of theoretical) of a white powder having a melting point of 243–5° C. and an equivalent weight of 260 (calculated 253).

The equivalent weights were determined by potentiometric titration either of aqueous suspension or isopropanolglycol solutions of the material.

This compound may also be named as ethylene diamine-N,N' bis[α(m,p-dichlorobenzylphosphonous acid)].

Example II

Ethylenediamino - N,N'-bis(benzylphosphinic acid) has been prepared as follows:

To a suspension in 30 grams of ethanol of 20 grams (0.085 m.) of Schiff base (from ethylenediamine and benzaldehyde) was added 22.4 grams (0.17 m.) of 50% aqueous hypophosphorus acid. The mixture was heated under reflux for 1½ hours. The slurry obtained was diluted with 200 ml. of acetone, filtered, slurried again with acetone, filtered and dried. Yield: 19 grams (61%); P anal.: calcd., 16.85%, found, 16.1% (95.5% pure).

Example III

Ethylenediamino - N,N'-bis(o-chlorobenzyl phosphinic acid) can be prepared as follows:

To a solution of 25.9 grams (0.085 m.) of Schiff base (from ethylenediamine and o-chlorobenzaldehyde) in 40 grams of ethanol was added 22.4 grams (0.17 m.) of 50% aqueous hypophosphorus acid. The mixture was heated to reflux. After ½ hour, a turbidity appeared which gradually increased with time. Refluxing was continued for an additional 2½ hours. The mixture was cooled to 0° C. for 16 hours, then added with stirring to 500 ml. of acetone and the resulting precipitate filtered. A lumpy material was obtained. This was dried under vacuum, then dissolved in 100 ml. of methanol and added with stirring to 1 liter of acetone, filtered and dried. Yield: 31 grams (83.5%); P anal.: calcd., 14.2%; found, 14.2%.

This compound may also be named as ethylenediamine-N,N' bis[α(o-chlorobenzylphosphonous acid)].

Example IV

Ethylenediamino-N,N'-bis(o-hydroxylbenzyl phosphinic acid) has been prepared as follows:

Using the same procedure as set forth in Example III above, the following quantities were used: 2.8 grams (0.085 m.) of Schiff base (from ethylenediamine and salicylaldehyde), 64 grams of ethanol and 22.4 grams (0.17 m.) of 50% aqueous hypophosphorus acid. Yield: 32 grams (94.2%; P anal.: calcd., 15.5%; found, 14.7% (95% pure).

Example V

Ethylenediamino-N,N'-bis(p-hydroxybenzyl phosphinic acid) has been prepared as follows:

Using the same procedure as set forth in Example III above, the following quantities were used: 22.8 grams (0.085 m.) of Schiff base (from ethylenediamine and p-hydroxybenzaldehyde), 40 grams of ethanol and 22.4 grams (0.17 m.) of 50% aqueous hypophosphorus acid. Yield: 29 grams (85.4%); P anal.: calcd., 15.5%; found, 15.7%.

Example VI

Ethylenediamino - N,N'-bis(naphthalphosphinic acid) has been prepared as follows:

Using the same procedure as set forth in Example III above, the following quantities were used: 28.6 grams (0.085 m.) of Schiff base (from ethylenediamine and 1-naphthaldehyde), 65 grams of ethanol and 22.4 grams (0.17 m.) of 50% aqueous hypophosphorus acid. Yield: 1 grams (28%); P anal.: calcd., 13.25%; found, 13.23%.

When tested in nutrient broth, the inhibition concentration of the bis-aminophosphinic acids is in the order of from about 50 to somewhat more than 500 parts per million (p.p.m.). There is a definite reduction of the inhibition concentration when the bis-aminophosphinic acids are present as their alkali metal or ammonium salts. The same reduction occurs if the bis-aminophosphinic acids are allowed to act in an alkaline environment, such as is present in a soap solution. Moreover, increased substitution of halogens is the aryl groups improves the activity of these acids against gram-positive bacteria. Interestingly enough, increased substitution of halogens in the aryl group causes somewhat of a reduction in activity against gram-negative organisms.

Example VII

The antibacterial properties of these bis-aminophosphinic acids have been tested and the minimum concentrations required to inhibit the growth of *S. aureus* and *E. coli* in broth and in soap are set forth below:

| R—CH—NH—R' \| $PO_2H_2$ \| R | —NH—CH—R \| $PO_2H_2$ \| R | Minimum concentration (p.p.m.) to inhibit bacterial growth | | | |
|---|---|---|---|---|---|
| | | *S. aureus* | | *E. coli* | |
| | | Broth | Soap | Broth | Soap |
| 1. phenyl | $C_2H_4$ | >100 | 100 | >100 | 80 |
| 2. o-Cl-phenyl | $C_2H_4$ | >100 | 100 | >100 | 80 |
| 3. o-OH-phenyl | $C_2H_4$ | >100 | 60 | >100 | 80 |
| 4. p-HO-phenyl | $C_2H_4$ | >100 | 100 | >100 | 80 |
| 5. 2,4-diCl-phenyl | $C_2H_4$ | 50 | 10 | >500 | 200 |
| 6. naphthyl | $C_9H_4$ | >100 | 30 | >500 | 200 |

While the invention has been disclosed in considerable detail for purposes of illustration, it should be understood by those skilled in the art that many of the details may be varied without departing from the spirit and scope of our invention.

We claim:
1. A compound having the formula

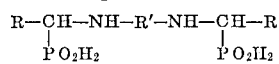

wherein R is selected from the group consisting of phenyl, naphthyl and halogen substituted phenyl and R' is an alkylene radical having 2 to 4 carbons.

2. Ethylenediamine - N,N' bis[α(m,p - dichlorobenzylphosphonous acid)].

3. Ethylenediamine - N,N' bis[α(o-chlorobenzylphosphonous acid)].

References Cited

UNITED STATES PATENTS

| | | | |
|---|---|---|---|
| 2,374,807 | 5/1945 | Dickey et al. | 260—500 |
| 1,607,113 | 10/1926 | Benda et al. | 260—500 |
| 3,134,738 | 5/1964 | Wood et al. | 260—106 |
| 3,118,842 | 1/1964 | Besser | 260—106 |
| 2,632,018 | 3/1953 | Kosolapoff | 260—461 |
| 2,286,794 | 6/1942 | Dickey et al. | 252—8.8 |
| 2,831,881 | 4/1958 | Bell et al. | 260—461 |
| 3,036,108 | 5/1962 | Frost | 260—932 |
| 3,288,846 | 11/1966 | Irani et al. | |

FOREIGN PATENTS 934,090  8/1965  Great Britain.

OTHER REFERENCES

Frank: "Chem. Rev.," vol. 61 (1961), pp. 389 to 394.
Houben-Weyl: "Methoden Der Organischen Chemie," Band 12, part 1 (1963), pp. 299–300.

LEON ZITVER, *Primary Examiner.*

J. E. EVANS, *Assistant Examiner.*

U.S. Cl. X.R.

167—30, 31, 32; 252—106; 260—566

UNITED STATES PATENT OFFICE
CERTIFICATE OF CORRECTION

Patent No. 3,432,547                                        March 11, 1969

Andrew T. Guttmann et al.

It is certified that error appears in the above identified patent and that said Letters Patent are hereby corrected as shown below:

Column 3, line 34, "(94.2%" should read -- (94.2%) --; line 56, "1 grams" should read -- 11 grams --; line 66, "is" should read -- in --. Column 4, in the table, subheading to the second column, "R" should read -- R' --; same table, first and second columns, last lines thereof, the entries should appear as shown below:

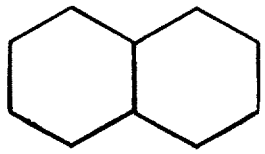          

Signed and sealed this 14th day of April 1970.

(SEAL)
Attest:

EDWARD M. FLETCHER, JR.                  WILLIAM E. SCHUYLER, JR.
Attesting Officer                              Commissioner of Patents